United States Patent [19]

Michael et al.

[11] 3,873,499
[45] Mar. 25, 1975

[54] FAST CURING MERCAPTOALKYL VINYL SILOXANE RESINS

[75] Inventors: Keith W. Michael; Alan E. Mink; Darrell D. Mitchell, all of Midland, Mich.

[73] Assignee: Dow Corning Corporation, Midland, Mich.

[22] Filed: Nov. 29, 1973

[21] Appl. No.: 420,180

[52] U.S. Cl.... 260/46.5 E, 117/123 C, 117/126 GS, 117/132 BS, 117/161 ZA, 204/159.13, 260/45.95 E, 260/45.95 G, 260/46.5 UA, 260/46.5 G, 260/825
[51] Int. Cl. ............................................ C08f 11/04
[58] Field of Search ... 260/46.5 UA, 46.5 G, 46.5 E, 260/45.95 E, 45.95 G, 825; 204/159.13, ; 117/161 ZA, 123 C, 126 GS, 132 BS

[56] References Cited
UNITED STATES PATENTS
3,632,715   1/1972   Gowdy et al.................. 204/159.13

Primary Examiner—Melvyn I. Marquis
Attorney, Agent, or Firm—Robert F. Fleming, Jr.

[57] ABSTRACT

Low temperature, fast curing electrical and coating resins, activated by ultraviolet or other low energy radiation, are obtained by mixing mercaptoalkyl siloxane resins with methylvinyl siloxanes and subjecting the mixture to ultraviolet light. An exemplary formulation is: 8.5 parts by weight of the copolymer of 20 mol percent mercaptopropyl siloxane, 50 mol percent monopropyl siloxane, 20 mol percent dimethyl siloxane and 10 mol percent monomethyl siloxane and 1.5 parts by weight of methylvinyl cyclosiloxane wherein the cyclics contain from 4 to 8 silicon atoms. These resins are particularly designed for circuit board coatings.

4 Claims, No Drawings

FAST CURING MERCAPTOALKYL VINYL SILOXANE RESINS

It is known that mercaptoalkyl-containing siloxanes can be cured by reacting them with vinyl-containing siloxanes under the action of ultraviolet light. Such compositions are disclosed and claimed in U.S. application Ser. No. 401,791, filed Sept. 28, 1973, by George A. L. Gant and assigned to the assignee of this invention. The compositions of the aforesaid Gant application are primarily designed for release coatings and they do not possess the unique combination of properties of the compositions of this invention.

The instant compositions are designed to give fast cure at low temperature, to give flexible yet hard coatings, to be thermally stable to the extent that the coating will not blister when subjected to molten solder (i.e., 650°F.) for 20 seconds, to have good dielectric properties (i.e. a 2 mil film will have an insulation resistance of $10^9$ megohms/mil) and an insulation breakdown of at least 500 volts/mil using a D.C. current. In addition, the coatings have excellent unprimed adhesion to glass, the metals used in electrical devices, plastics such as epoxies, polyesters and polyolefins and cured silicone rubber. These combinations of properties make the compositions of the instant invention uniquely useful for circuit board coatings but they are also useful for coating glass optical fibers and flashbulbs as will be described hereafter.

This invention relates to a mixture of (1) a copolymer of 10 to 30 mol percent $HSR'SiO_{3/2}$, 10 to 75 mol percent monopropyl siloxane, 5 to 35 mol percent dimethyl siloxane and 5 to 43 mol percent monomethyl siloxane in which R' is an ethylene or propylene radical and (2) a methylvinylpolysiloxane compatible with (1) having an average of at least three vinyl groups per molecule in the proportion of 0.8 vinyl per SH to 1.2 vinyls per SH and (3) a gellation inhibitor of the group consisting of

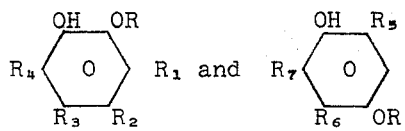

in which R is H, an alkyl radical of 1 to 10 carbon atoms or acetyl and $R_1$ to $R_7$ are individually hydrogen or an alkyl radical of 1 to 12 carbon atoms.

This invention also relates to substrates coated with the cured mixture of (1) and (2). These coatings are prepared by applying the combination of (1), (2) and (3) to the substrate and then subjecting the substrate to ultraviolet radiation or to electron radiation. It should be understood, of course, that the coated substrates are not limited to those prepared by curing the resin with ultraviolet or electron radiation. The coatings can also be prepared by incorporating free radical generators such as peroxides in the mixture and curing by heat alone. The compositions of this invention are uniquely suitable for coatings particularly in assembly line operations since the mixture of (1) and (2) is a liquid material and usually falls within the viscosity range of about 10,000 to about 100,000 cs. Since no solvents are required, there are no materials given off during the cure which contaminate the atmosphere. This is particularly beneficial in this age of ecological problems.

It should be understood, of course, that if desired the compositions of this invention can be diluted with solvents and they will operate as if they were coated neat.

Ingredient (1) of the composition is the base resin and the proportion of the ingredients shown herein are critical for the properties desired in the coatings of this invention. First it is to be noted that the coatings contain no phenyl radicals, since it has been found that the presence of phenyl radicals in any significant number retards the rate of cure to an extent not desired for commercial operation of electrical coating resins. It is unexpected that the compositions of this invention in spite of the absence of phenyl and in spite of the presence of higher alkyl groups have sufficient thermal stability to withstand soldering temperatures of 650°F. or more.

The mercaptoalkyl groups employed in this invention can be either mercaptopropyl or mercaptoethyl radicals and the function of this group is to serve as a crosslinking site and also to contribute to the flexibility of the finished coating. The propyl siloxane lowers the overall viscosity of the composition and adds flexibility when compared with monomethyl. Dimethyl siloxane serves as a flexibilizing agent and the monomethyl siloxane is used to build the viscosity. By varying the proportions of the various ingredients, particularly the monomethyl siloxane, one can change the viscosity of the coating composition from 10,000 to 100,000 cs. or more.

Ingredient (1) is prepared by cohydrolyzing the corresponding silanes in the conventional manner for cohydrolysis and cocondensation of silanes. After hydrolysis the silanes are washed free of acid then heated to body the resin. The latter consists of refluxing in solvent at the desired concentration in order to build the viscosity of the resin to the desired extent. Generally, concentrations of 30 to 65 percent are sufficient. During the bodying step the hydroxyl groups on the siloxane units condense to increase the molecular weight of the resin.

Ingredient (2) of this invention can be any methylvinyl polysiloxane which is compatible with ingredient (1) and which has at least three vinyl groups per molecule. It has been found that the best materials are cyclic methylvinyl siloxanes in which the cyclics contain from 4 to 8 silicon atoms. However, the crosslinker does not have to be of cyclic structure, it can be linear or branched in structure. For example, the crosslinker can be a low molecular weight trimethylsiloxy endblocked methylvinyl siloxane containing, say, from 4 to 8 silicon atoms. In addition the crosslinker can be a vinyldimethylsiloxy endblocked methylvinyl polysiloxane of, say, 10 silicon atoms or alternatively, the crosslinker can be branched, for example, a copolymer of monomethyl siloxane, methylvinyl siloxane, and dimethylvinyl siloxane containing a total of 15 silicon atoms. The only critical feature is that the crosslinker be a methylvinyl polysiloxane and that it be compatible with (1).

The proportions of (1) and (2) should be such that the mol ratio of vinyl groups to SH groups is in the range 0.8:1 to 1.2:1 and best results are usually obtained when the ratio is 1:1.

When (1) and (2) are mixed, the mixture will spontaneously cure at room temperature in a relatively short period of time. For this reason, if (1) and (2) are to be used per se as a coating composition, the mixture must be applied to the substrate immediately after mixing.

This can be done by employing a mixing head similar to those used in production of polyurethane foams. In this case (1) and (2) would be brought together in a mixing head and immediately applied to the substrate where they would cure spontaneously or with or without the application of heat. Preferably, however, for commercial operation the mixture of (1) and (2) should have a pot life of at least 24 and preferably 48 hours. In order to obtain this desirable pot life, it is necessary to employ an inhibitor (3) in the compositions of this invention.

The purpose of the inhibitor is to absorb free radicals sufficiently well that the composition will not gel at room temperature for, say, from 8 to 48 hours but will cure very rapidly when the inhibited composition is applied to a substrate and then exposed to ultraviolet radiation. For this purpose, any suitable inhibitor can be used but the best inhibitors known to the inventors at this time are dihydric phenols and their alkylated derivatives. More particularly, the inhibitors are pyrocatechol or hydroquinone or monoethers thereof or alkyl-substituted hydroquinones or pyrocatechols or alkyl-substituted monoethers thereof. These materials are set forth in detail in "Stabilization of Polymers and Stabilizer Processes," a publication of the American Chemical Society, 1969. Pages 169 to 201 of this publication are incorporated herein by reference.

For the purpose of this invention R can be hydrogen or any alkyl radical of 1 to 10 carbon atoms such as methyl, propyl, isopropyl, t-butyl, octyl, t-octyl, or decyl. Any of the $R_1$, $R_2$, $R_3$, $R_4$, $R_5$, $R_6$ and $R_7$ can be hydrogen or an alkyl radical of from 1 to 12 carbon atoms such as methyl, ethyl, octyl, t-butyl or dodecyl.

The best way of employing the compositions of this invention is to mix the inhibitor with ingredient (2) and then mix this in any desired fashion with ingredient (1). The resulting composition will be stable for 24 hours or more and can then be applied to the substrate in any convenient fashion. If desired, solvents can be employed to dilute the composition.

The best method of curing the compositions of this invention is by way of ultraviolet light. The compositions will cure in seconds but the precise time of cure varies with the intensity of the radiation, with the amount and kind of inhibitor used and with the precise formulation of the resin. For example, the compositions will cure in three seconds or less using a mercury vapor 900 watt ultraviolet lamp giving radiation in the range of 1800 to 4000 A, said lamp being located 3 inches from the coated substrate. With a 35 watt ultraviolet source giving radiation in the range of 2537 A and located 4 inches from the substrate, the compositions will cure in 20 to 30 seconds.

As stated above, the compositions of this invention are uniquely useful for coating electrical circuit boards. This is particularly true with respect to flexible circuit boards wherein the metal circuits are applied to a thin, flexible substrate generally made of a combination of plastic fibers and epoxy resins, or of glass fibers and epoxy resins. Some of the requirements for a coating for such substrates is that it be flexible enough to pass the one-eighth to one-fourth inch mandrel test, that it have a pencil hardness of at least H and preferably 1H and that it have the following electrical properties: a 2 mil film should have an insulation resistance of $10^9$ megohms as measured by ASTM-D-257 and an insulation breakdown of 500 volts/mil/minute using a D.C. current. In addition, the film should have a thermal stability sufficient that it will not deteriorate when subjected to molten solder for 20 seconds. Finally, the adhesion of the film to the metal and plastic substrate should be such that it will pass successfully the above mandrel test without delaminating. The compositions of this invention meet all of the above requirements.

In addition to coating electrical devices, the compositions of this invention are useful for coating optical fibers used as light switches in computers. The purpose of the coating is to protect the fibers during fabrication of the fibers and of the devices. The fiber is drawn, run through the resin mixture, then cured with ultraviolet or electron radiation and wound on a spool. The wound fiber is then transferred to other spools and this must be done without cracking or abrasion of the coating.

The compositions of this invention may contain other nonessential ingredients such as fillers, pigments or other materials which will not interfere with the radiation cure.

The following examples are illustrative only and should not be construed as limiting the invention which is properly delineated in the appended claims.

EXAMPLE 1

A mixture of silanes in toluene was prepared as follows:
196 g. (20 mol percent) mercaptopropyltrimethoxysilane,
488 g. (55 mol percent) propyltrichlorosilane,
37 g. (5 mol percent) methyltrichlorosilane,
129 g. (20 mol percent) dimethyldichlorosilane, and
726 g. of toluene.

The mixture was added over a period of 6 minutes to 2170 g. of water at a temperature of 29° to 79°C. and the mixture was thereafter stirred 16 minutes at a temperature of 70°C. The organic layer was washed with 2 liters of 60°C. water and thereafter separated. The organic layer was refluxed to azeotrope water and the solution was then cooled.

0.4 percent by weight of toluene sulfonic acid based on the yield of 482 g. of polysiloxane resin was added at 50°C. and the solution was refluxed 3 hours at 114°C. During this time 8 cc. of water was removed. The solution was cooled to 88°C. and neutralized with hexamethyldisilazane. The solution stood overnight, was then filtered through acid-washed diatomaceous earth and the solvent was removed by heating at 120°C. under reduced pressure. The resulting resin had a viscosity of 108,000 cs. at 25°C.

The above resin was mixed with a mixture of methylvinyl siloxanes having from 4 to 8 silicon atoms per molecule in the proportion of 14.5 g. of resin to 2.6 g. of methylvinyl siloxane cyclics. The mixture gelled in 8 hours at room temperature. 1200 parts per million paramethoxy phenol was added and the mixture had not gelled after two weeks at room temperature. The inhibited mixture cured in 120 seconds under an ultraviolet lamp of 35 watt power having 90 percent of its radiation at 2537 A.

EXAMPLE 2

The procedure of Example 1 was repeated except that 100 g. of isopropyl alcohol was added to the water prior to the addition of the toluene solution of the mixed silanes.

8.5 parts of the resulting resin was mixed with 1.5 parts of the mixed methylvinylpolysiloxane cyclics of Example 1 and 90 parts per million of paramethoxy phenol. The inhibited resin mixture was coated on an aluminum panel and it cured in three seconds when subjected to the radiation of a 900 watt medium pressure mercury lamp placed three inches from the coated panel. The cured resin showed excellent adhesion to aluminum and copper.

EXAMPLE 3

A mixture of 3126 g. (20 mol percent) of mercaptopropyl trimethoxysilane, 7100 g. (50 mol percent) of propyltrichlorosilane, 1169 g. (10 mol percent) methyltrichlorosilane, 2064 g. (20 mol percent) dimethyldichlorosilane, and 11,333 g. of toluene were mixed and the mixture was added to a mixture of 35,689 g. of water and 681 g. of isopropanol. The addition of the mixed silanes required 20 minutes and was carried out at a temperature of 15° to 65°C. followed by stirring and heating 20 minutes at 65°C. The organic layer was separated and then washed with water which had been heated to 80°C. The organic layer was heated to reflux to remove water, cooled to 75°C. and 38 g. of a 40 percent solution of toluene sulfonic acid in the dimethyl ether of ethylene glycol was added and the mixture bodied by heating 5 hours at 110°C. The solution was then cooled to 85°C., neutralized with 20 g. of hexamethyldisilazane, filtered and the solvent was then removed under vacuum. The resulting resinous product had a viscosity of 61,129 cs.

8.6 parts of this resin was mixed with 1.4 parts of the cyclic methylvinyl siloxanes of Example 1 and 90 parts per million of para methoxy phenol inhibitor. The mixture was stable for at least 24 hours after mixing. The stabilized mixture was coated on a substrate and it cured in 30 seconds under a 35 watt ultraviolet lamp. The flexibility and adhesion of the resin to aluminum was shown by the fact that the cured film did not crack when the coated panel was bent around a one-fourth inch mandrel. The cured resin also had excellent adhesion to glass cloth and to epoxy resin. The cured film was found to have the required insulation resistance and thermal stability for use as a coating for electrical circuit boards. In addition it was shown that the film had a limited oxygen index of 27.0.

Nineteen flashbulbs containing oxygen under pressure and magnesium filaments were coated with this resin and none of the bulbs cracked when they were flashed. This shows that the resin is suitable as a protective coating for magnesium flashbulbs containing oxygen under pressure.

EXAMPLE 4

Using the procedure of Example 3, the following formulation was made:
  20 mol percent mercaptopropyl siloxane,
  40 mol percent monopropyl siloxane,
  30 mol percent dimethyl siloxane, and
  10 mol percent monomethyl siloxane.
8.4 parts of the resulting bodied resin was mixed with 1.6 parts of the methylvinyl siloxane cyclics of Example 1 and 200 parts per million para methoxy phenol. The resulting mixture was coated on the aluminum substrate and cured with the 35 watt ultraviolet lamp. The coated panel could be bent around a one-sixteenth inch mandrel without cracking of the coating or delamination from the substrate.

EXAMPLE 5

Using the procedure of Example 3, a resin was prepared having a viscosity of 82,600 cs. and the composition, 15 mol percent mercaptopropyl siloxane, 20 mol percent monopropyl siloxane, 40 mol percent monomethyl siloxane, and 25 mol percent dimethyl siloxane.

11.4 parts by weight of this resin was mixed with 1.72 parts by weight of the methylvinyl cyclics of Example 1 and 200 parts per million of para methoxy phenol. The resulting mixture had a viscosity of 13,400 cs. The mixture was coated on an aluminum panel and cured in 30 seconds when subjected to a 35 watt ultraviolet lamp. The coated panel had a pencil hardness of H and could be bent around a one-eighth inch mandrel without the film cracking or pulling away from the aluminum surface. The resin mixture was coated on glass cloth and it was found that the limited oxygen index of the coated cloth was 30.0. The inhibited composition was also coated on a board made by impregnating Dacron fibers with epoxy resin. The board was coated with the resin of this example and the resin cured as stated above. The coated board was subjected to molten solder and the silicone resin survived, whereas the Dacron epoxy substrate deteriorated. This shows the thermal stability of the resins of this invention is superior to that of Dacron-epoxy combinations.

EXAMPLE 6

This example shows the stabilizing effect of phenols on the compositions of this invention. An aliphatic mercaptopropyl-containing siloxane resin was mixed with the methylvinyl cyclo siloxanes of Example 1 in amount of one vinyl group per SH group. The inhibiting effect of the various phenols as shown at room temperature is shown below:

| Inhibitor | Amount | Gel Time |
| --- | --- | --- |
| None | — | 3 min. |
| Hydroquinone* | 0.1% by wt. | >4 hrs. |
| p-Methoxy Phenol | 0.2% by wt. | >4 hrs. |

*The hydroquinone was employed as a 25% ethanol solution while the para methoxy phenol was used as a 50% ethanol solution.

In both cases where the inhibitors were used, 0.65 percent by weight of t-butylperbenzoate was used to speed up the gel time. When the peroxide was mixed with the resin without inhibitor, the gel time was too fast to measure.

EXAMPLE 7

The following vinylmethyl siloxanes can be substituted for those of Example 1:

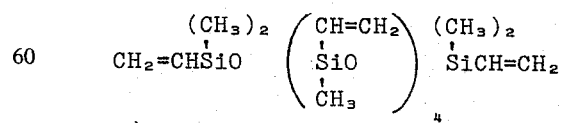

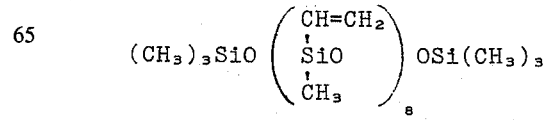

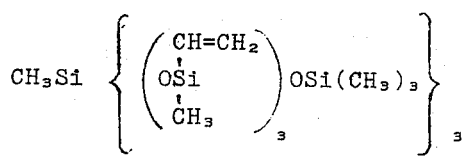

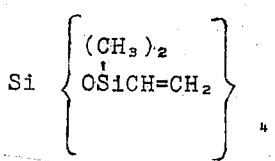

EXAMPLE 8

The following inhibitors can be used in place of para methoxy phenol:
  4-dodecyl pyrocatechol
  3-methyl pyrocatechol
  4-methyl,5-t-butyl pyrocatechol
  3-t-octyl,5-t-dodecyl pyrocatechol
  3,6-dimethyl pyrocatechol
  pyrocatechol
  2-methoxy phenol
  2-t-butoxy,4-t-octyl phenol
  2-ethoxy,4-methyl,6-t-octyl phenol
  2,5-diisopropyl hydroquinone
  2,6-di-t-amyl hydroquinone
  2-t-octyl,4-acetoxy phenol
  2,5-dimethyl,4-methoxy phenol
  2,6-di-t-butyl,4-methoxy phenol

EXAMPLE 9

An equivalent resin is obtained when HSCH$_2$CH$_2$SiO$_{3/2}$ is substituted for the mercaptopropyl siloxane of Example 1.

That which is claimed is:

1. A composition of matter consisting essentially of
   1. a copolymer of 10 to 30 mol percent HSR'SiO$_{3/2}$, 10 to 75 mol percent monopropyl siloxane, 5 to 35 mol percent dimethyl siloxane, and 5 to 43 mol percent monomethyl siloxane, in which R' is a propylene or ethylene radical and
   2. a methylvinylpolysiloxane compatible with (1) having an average of at least three vinyl groups per molecule in amount of from 0.8 vinyl per SH to 1.2 vinyls per SH, and
   3. a gellation inhibitor of the group consisting of

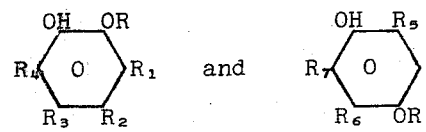

in which R is hydrogen, an alkyl radical of 1 to 10 carbon atoms or acetyl and R$_1$ to R$_7$ are each independently hydrogen or an alkyl radical of 1 to 12 carbon atoms.

2. The composition in accordance with claim 1 in which R' is a propylene radical and (3) is para methoxy phenol.

3. A substrate coated with a cured mixture of (1) and (2) of claim 1.

4. A substrate coated with a cured mixture of (1) and (2) of claim 2.

* * * * *